United States Patent
Yoshida et al.

(10) Patent No.: US 11,996,543 B2
(45) Date of Patent: May 28, 2024

(54) NONAQUEOUS ELECTROLYTE SECONDARY BATTERY INCLUDING NEGATIVE ELECTRODE ACTIVE MATERIAL LAYER WITH REASONABLE LARGE TORTUOSITY RATIO

(71) Applicant: Prime Planet Energy & Solutions, Inc., Tokyo (JP)

(72) Inventors: Takeshi Yoshida, Kakogawa (JP); Hirofusa Tanaka, Kasai (JP); Yuji Ogishima, Himeji (JP); Keisuke Minami, Himeji (JP); Toyoki Fujihara, Kanzaki (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 197 days.

(21) Appl. No.: 17/443,816

(22) Filed: Jul. 27, 2021

(65) Prior Publication Data

US 2022/0052313 A1 Feb. 17, 2022

(30) Foreign Application Priority Data

Aug. 11, 2020 (JP) .................. 2020-135688

(51) Int. Cl.
*H01M 4/13* (2010.01)
*H01M 4/02* (2006.01)
*H01M 10/0525* (2010.01)

(52) U.S. Cl.
CPC ......... *H01M 4/13* (2013.01); *H01M 10/0525* (2013.01); *H01M 2004/021* (2013.01); *H01M 2004/027* (2013.01)

(58) Field of Classification Search
CPC ............. H01M 4/13; H01M 2004/021; H01M 10/0525

(Continued)

(56) References Cited

U.S. PATENT DOCUMENTS

2008/0241685 A1* 10/2008 Hinoki .................... H01M 4/13
429/209
2008/0248387 A1* 10/2008 Hinoki .............. H01M 10/4235
429/209

(Continued)

FOREIGN PATENT DOCUMENTS

CN       101276899 A    10/2008
CN       105226283 A     1/2016

(Continued)

OTHER PUBLICATIONS

Dang et al., Freeze-dried low-tortuous graphite electrodes with enhanced capacity utilization and rate capability, Oct. 2019, Carbon, 159, 133-139 (Year: 2019).*

*Primary Examiner* — Sean P Cullen
(74) *Attorney, Agent, or Firm* — HAUPTMAN HAM, LLP

(57) ABSTRACT

In a cross section parallel to a thickness direction of a negative electrode active material layer, an average tortuosity ratio is 1.5 to 2.5. The average tortuosity ratio is calculated by the following formula: "R=B/A". In the formula, "R" represents the average tortuosity ratio. "B" represents an average value of lengths of shortest routes each extending from a contact point between a negative electrode substrate and a negative electrode active material particle to a surface of the negative electrode active material layer along contour lines of a plurality of negative electrode active material particles. "A" represents an average value of a thicknesses of the negative electrode active material layer.

7 Claims, 7 Drawing Sheets

(58) Field of Classification Search
USPC .............................................. 429/209, 231.8
See application file for complete search history.

(56) References Cited

U.S. PATENT DOCUMENTS

| | | | |
|---|---|---|---|
| 2014/0127564 A1* | 5/2014 | Han | ...................... H01M 4/587 |
| | | | 429/211 |
| 2015/0380725 A1 | 12/2015 | Mine et al. | |
| 2017/0098822 A1* | 4/2017 | Yachi | ................ H01M 10/0525 |
| 2021/0320302 A1 | 10/2021 | Takabayashi et al. | |

FOREIGN PATENT DOCUMENTS

| | | | |
|---|---|---|---|
| CN | 106463695 A | | 2/2017 |
| JP | 200275331 A | | 3/2002 |
| JP | 2008251250 A | | 10/2008 |
| JP | 201541434 A | | 3/2015 |
| JP | 2015041434 A | * | 3/2015 |
| JP | 201612458 A | | 1/2016 |
| JP | 2020119630 A | | 8/2020 |
| WO | 2016136803 A1 | | 9/2016 |
| WO | 2019031380 A1 | | 2/2019 |

* cited by examiner

NONAQUEOUS ELECTROLYTE SECONDARY BATTERY INCLUDING NEGATIVE ELECTRODE ACTIVE MATERIAL LAYER WITH REASONABLE LARGE TORTUOSITY RATIO

This nonprovisional application is based on Japanese Patent Application No. 2020-135688 filed on Aug. 11, 2020, with the Japan Patent Office, the entire contents of which are hereby incorporated by reference.

BACKGROUND OF THE INVENTION

Field of the Invention

The present disclosure relates to a nonaqueous electrolyte secondary battery.

Description of the Background Art

Japanese Patent Laying-Open No. 2016-012458 discloses that a tortuosity ratio of a lithium ion migration route in a carbonaceous film of an electrode material is 1.1 to 100.

SUMMARY OF THE INVENTION

A nonaqueous electrolyte secondary battery (hereinafter, also simply referred to as "battery") is used in various manners depending on its purpose of use. For example, when the battery is used as a main electric power supply, a motive power assisting electric power supply, or the like for an electrically powered vehicle, high-rate charging and high-rate discharging may be performed alternately. Hereinafter, such a manner of use is also referred to as "high-rate charging/discharging".

After continuously repeating the high-rate charging/discharging, a battery output may be temporarily decreased. The decreased output is temporary and the output will be restored in many cases. However, the output is desirably stable before and after the high-rate charging/discharging.

An object of the present disclosure is to suppress a decreased output after high-rate charging/discharging.

Hereinafter, the technical configuration, function and effect of the present disclosure will be described. However, the mechanism of the function of the present disclosure includes a presumption. The scope of claims are not limited by whether or not the mechanism of the function is correct.

[1] A nonaqueous electrolyte secondary battery includes an electrode assembly and an electrolyte solution. The electrode assembly is impregnated with at least part of the electrolyte solution. The electrode assembly includes a positive electrode plate, a negative electrode plate, and a separator. The separator separates the positive electrode plate and the negative electrode plate from each other. The negative electrode plate includes a negative electrode substrate and a negative electrode active material layer. The negative electrode active material layer is disposed on a surface of the negative electrode substrate. The negative electrode active material layer includes a plurality of negative electrode active material particles. In a cross section parallel to a thickness direction of the negative electrode active material layer, an average tortuosity ratio is 1.5 to 2.5.

The average tortuosity ratio is calculated by the following formula (1):

$$R = B/A \quad (1).$$

In the formula (1), "R" represents the average tortuosity ratio. "B" represents an average value of lengths of shortest routes each extending from a contact point between the negative electrode substrate and a negative electrode active material particle to a surface of the negative electrode active material layer along contour lines of the plurality of negative electrode active material particles. "A" represents an average value of a thickness of the negative electrode active material layer.

The negative electrode active material layer is formed on the surface of the negative electrode substrate. The negative electrode active material layer includes the plurality of negative electrode active material particles. A gap is formed between the negative electrode active material particles. That is, it is considered that a pore is formed along the surfaces of the negative electrode active material particles. The plurality of negative electrode active material particles are in contact with one another in a continuous manner to form a pore extending from the surface of the negative electrode substrate to the surface of the negative electrode active material layer. The electrolyte solution are provided in the pore. Therefore, it is considered that the negative electrode active material particles are capable of a charging/discharging reaction even at a position away from the surface of the negative electrode active material layer in the thickness direction of the negative electrode active material layer.

The negative electrode active material particles are expanded during charging and are contracted during discharging. Therefore, the negative electrode active material layer is also expanded during charging and is also contracted during discharging. It is considered that as a current rate of charging/discharging is higher, expansion rate and contraction rate of the negative electrode active material layer are higher. When high-rate charging/discharging is continuously repeated, the negative electrode active material layer is rapidly expanded and contracted in a repeated manner. As a result, the negative electrode active material layer is moved like a pump.

When the negative electrode active material layer is expanded, the gap between the negative electrode active material particles is narrowed, with the result that the electrolyte solution is ejected from the negative electrode active material layer. When the negative electrode active material layer is contracted, the gap between the negative electrode active material particles is widened, with the result that the electrolyte solution is absorbed into the negative electrode active material layer. In the high-rate charging/discharging, an amount of ejection of the electrolyte solution tends to be larger than an amount of absorption of the electrolyte solution. When the high-rate charging/discharging is repeated, parts of the negative electrode active material particles are not supplied with the electrolyte solution. As a result, it is considered that the negative electrode active material particles contributing to the charging/discharging reaction are decreased to cause a temporarily decreased output. Thereafter, for example, when charging/discharging is performed under moderate conditions, the electrolyte solution is sufficiently absorbed in the negative electrode active material layer, and the output is considered to be restored.

The term "tortuosity ratio" in the present disclosure indicates a ratio of the length of a pore route extending from a surface of a negative electrode substrate to a surface of a negative electrode active material layer with respect to the thickness of the negative electrode active material layer. The term "average tortuosity ratio" indicates an average value of the tortuosity ratio. It is considered that as the average tortuosity ratio is smaller, a straighter pore is formed to extend from the surface of the negative electrode substrate toward the surface of the negative electrode active material layer. It is considered that as the average tortuosity ratio is larger, a meandering pore is formed to extend from the surface of the negative electrode substrate toward the surface of the negative electrode active material layer.

A conventional design concept is such that a smaller average tortuosity ratio is better. This is presumably due to the following reason: when the pore is in the form of a straight line and extends along the thickness direction of the negative electrode active material layer, the electrolyte solution is likely to permeate into the negative electrode active material layer.

However, according to a new finding in the present disclosure, with a reasonably large average tortuosity ratio, the temporarily decreased output after high-rate charging/discharging tends to be suppressed. It is considered that the reasonable complexity of the pore route leads to a decreased amount of ejection of the electrolyte solution. With the decreased amount of ejection of the electrolyte solution, a balance between the amount of ejection of the electrolyte solution and the amount of absorption of the electrolyte solution can be improved, with the result that a predetermined amount of the electrolyte solution can be maintained in the negative electrode active material layer even after the high-rate charging/discharging is repeated. As a result, it is considered that the decreased output is suppressed.

However, when the average tortuosity ratio is too large, the output tends to be decreased after the high-rate charging/discharging. It is considered that when the amount of absorption of the electrolyte solution is decreased, the balance is lost between the amount of ejection of the electrolyte solution and the amount of absorption of the electrolyte solution. As a result, it is considered that the amount of the electrolyte solution maintained in the negative electrode active material layer is reduced after the high-rate charging/discharging, thus resulting in the decreased output. In view of the above, in the present disclosure, the average tortuosity ratio is specified to fall within a range of more than or equal to 1.5 and less than or equal to 2.5.

[2] In the cross section parallel to the thickness direction of the negative electrode active material layer, the plurality of negative electrode active material particles may have an average aspect ratio of 2.5 to 4.0. When the average aspect ratio is more than or equal to 2.5 and less than or equal to 4.0, a reasonably complicated pore tends to be formed.

[3] In the cross section parallel to the thickness direction of the negative electrode active material layer, a ratio of the number of negative electrode active material particles each having an aspect ratio of more than or equal to 10 to the number of the plurality of negative electrode active material particles may be 5% to 22%. Hereinafter, the negative electrode active material particles each having an aspect ratio of more than or equal to 10 are also referred to as "large-aspect-ratio particles". When the ratio of the number of the large-aspect-ratio particles is more than or equal to 5% and less than or equal to 20%, a reasonably complicated pore tends to be formed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (hereinafter, also referred to as "the present embodiment") will be described. However, the scope of claims is not limited by the description below.

Each of geometric terms (for example, "parallel", "perpendicular", and the like) in the present embodiment indicate a state substantially corresponding to the geometric term. The geometric terms in the present embodiment should not be interpreted in a strict sense. For example, the term "parallel" indicates a substantially parallel state. That is, the term "parallel" may be deviated to some extent from the strict definition of the term "parallel". The expression "substantially parallel state" can surely include, for example, a tolerance, an error, and the like in terms of design, manufacturing, and the like.

In the present embodiment, the description "consisting essentially of" indicates that an additional component can be included in addition to an essential component to such an extent that the object of the present disclosure is not hindered. For example, a normally imaginable component in the technical field (such as an inevitable impurity) can be of course included.

In the present embodiment, when a compound is expressed by a stoichiometric composition formula such as "$LiCoO_2$", the stoichiometric composition formula merely indicates a representative example. For example, when a lithium cobaltate is expressed as "$LiCoO_2$", the lithium cobaltate is not limited to a composition ratio of "Li/Co/O=1/1/2", and can include Li, Co, and O at any composition ratio.

In the present embodiment, for example, a description such as "1.5 to 2.5" represents a range including the boundary values unless otherwise stated particularly. For example, the description "1.5 to 2.5" represents a range of "more than or equal to 1.5 and less than or equal to 2.5".

<Nonaqueous Electrolyte Secondary Battery>

Figure 1:
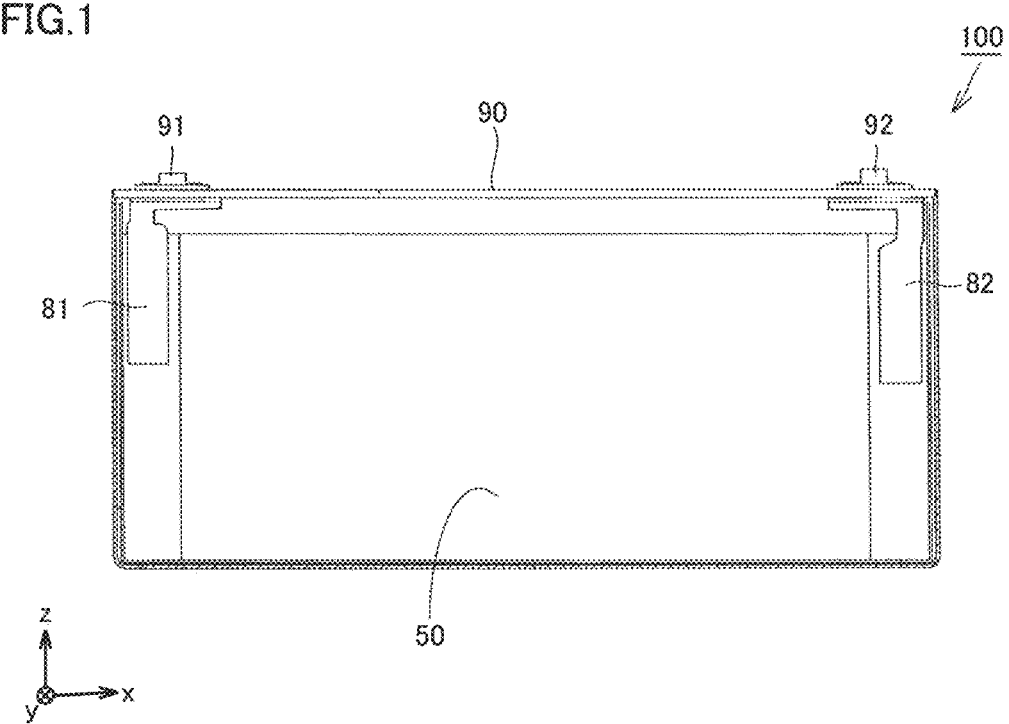
FIG. 1 is a schematic diagram showing an exemplary nonaqueous electrolyte secondary battery according to the present embodiment.

FIG. 1 is a schematic diagram showing an exemplary nonaqueous electrolyte secondary battery according to the present embodiment.

A battery 100 includes a battery case 90. Battery case 90 has a prismatic shape. However, the prismatic shape is exemplary. Battery case 90 can have any external shape. Battery case 90 stores an electrode assembly 50 and an electrolyte solution (not shown). That is, battery 100 includes electrode assembly 50 and the electrolyte solution.

<<Electrode Assembly>>

Figure 2:
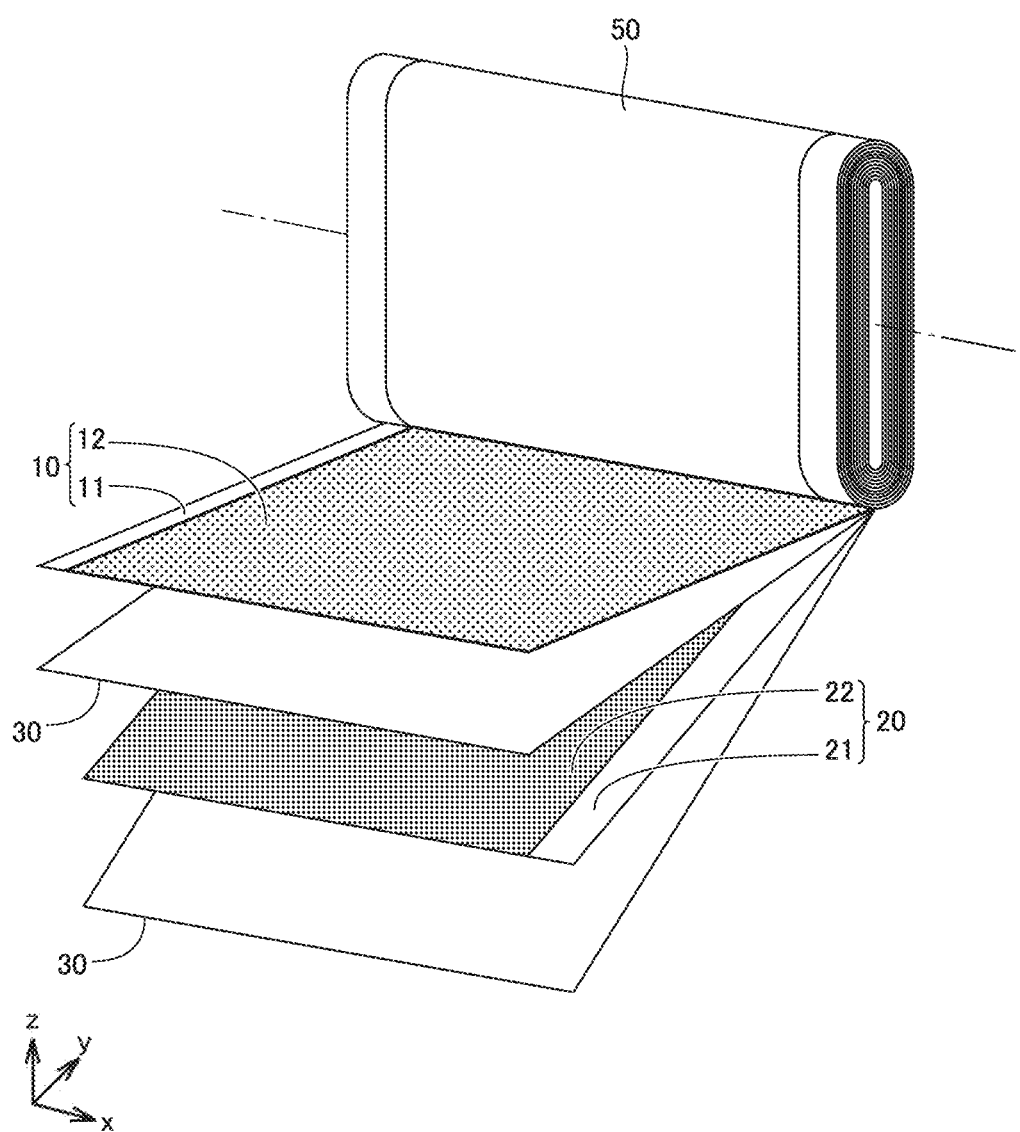
FIG. 2 is a schematic view showing an exemplary electrode assembly in the present embodiment.

FIG. 2 is a schematic view showing an exemplary electrode assembly in the present embodiment.

Electrode assembly 50 includes a positive electrode plate 10, a negative electrode plate 20, and separator(s) 30. Each of positive electrode plate 10, negative electrode plate 20, and separator(s) 30 is in the form of a sheet. Electrode assembly 50 of FIG. 2 is of a winding type. That is, separator 30, negative electrode plate 20, separator 30, and positive electrode plate 10 are layered in this order, and are spirally wound to form electrode assembly 50. It should be noted that electrode assembly 50 may be of a stack type.

<<Negative Electrode Plate>>

Figure 3:
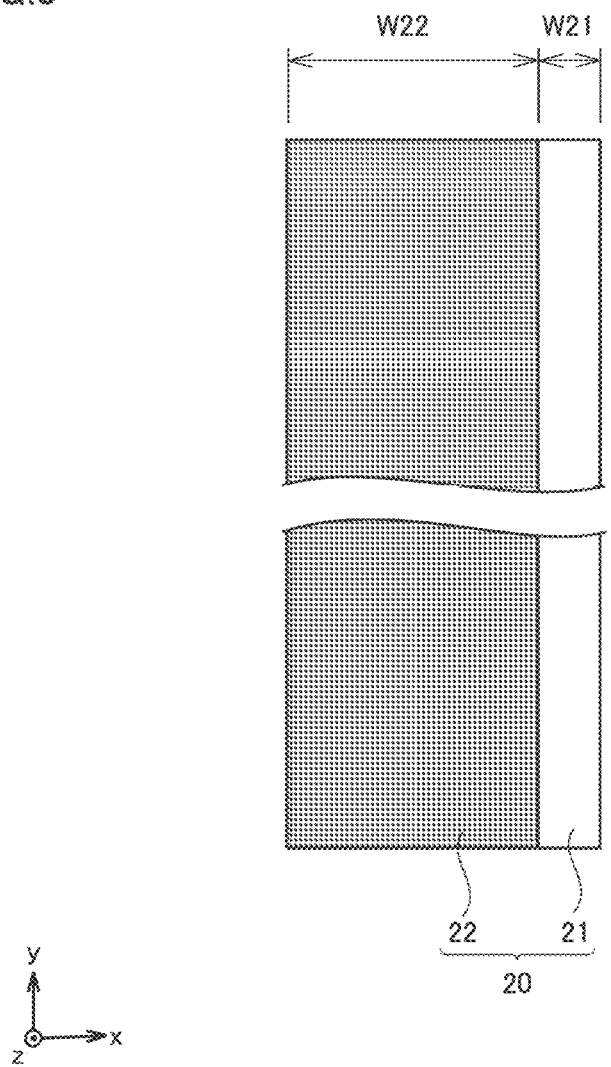
FIG. 3 is a schematic plan view showing an exemplary negative electrode plate in the present embodiment.

FIG. 3 is a schematic plan view showing an exemplary negative electrode plate in the present embodiment.

Negative electrode plate 20 is a sheet in the form of a strip. Negative electrode plate 20 includes a negative electrode substrate 21 and a negative electrode active material layer 22. Negative electrode substrate 21 may be, for example, a copper (Cu) alloy foil or the like. Negative electrode substrate 21 may also be referred to as, for example, a core body, a current collector, or the like. Negative electrode active material layer 22 is disposed on a surface of negative electrode substrate 21. Negative electrode active material layer 22 may be disposed on only one surface of negative electrode substrate 21. Negative electrode active material layer 22 may be disposed on each of front and rear surfaces of negative electrode substrate 21. A portion of negative electrode substrate 21 is exposed from negative electrode active material layer 22. Hereinafter, the exposed portion of negative electrode substrate 21 is also referred to as "negative electrode substrate exposed portion". The negative electrode substrate exposed portion is disposed at one end portion in a short side direction (x axis direction in FIG. 3). The negative electrode substrate exposed portion extends in a long side direction (y axis direction in FIG. 3). The negative electrode substrate exposed portion can be used for connection between electrode assembly 50 and negative electrode terminal 92.

(Composition)

Negative electrode active material layer 22 may consist essentially of a plurality of negative electrode active material particles. Each of the negative electrode active material particles may have any size. The negative electrode active material particles may have a D50 of, for example, 1 μm to 30 μm. The negative electrode active material particles may have a D50 of, for example, 3 μm to 20 μm. D50 represents a particle size corresponding to a cumulative particle volume of 50% from the smallest particle size with respect to the total particle volume in the volume-based particle size distribution. D50 can be measured by a laser diffraction type particle size distribution measurement device.

Each of the negative electrode active material particles can include any component. For example, the negative electrode active material particle may include at least one selected from a group consisting of natural graphite, artificial graphite, soft carbon, and hard carbon. The negative electrode active material particle may consist essentially of the natural graphite, for example. Negative electrode active material layer 22 may further include, for example, a conductive material, a binder, and the like in addition to the negative electrode active material particles. The conductive material can include any component. For example, the conductive material may include at least one selected from a group consisting of acetylene black, a vapor-grown carbon fiber, and a carbon nanotube. A blending amount of the conductive material may be, for example, 0.1 part by mass to 10 parts by mass with respect to 100 parts by mass of the negative electrode active material particles. The binder can include any component. For example, the binder may include at least one selected from a group consisting of a styrene-butadiene rubber (SBR), a carboxymethyl cellulose (CMC), and a polyacrylic acid (PAA). A blending amount of the binder may be, for example, 0.1 part by mass to 10 parts by mass with respect to 100 parts by mass of the negative electrode active material particles.

(Density)

Negative electrode active material layer 22 may have a density of, for example, 1.1 g/cm$^3$ to 1.4 g/cm$^3$. Negative electrode active material layer 22 may have a density of, for example, 1.1 g/cm$^3$ to 1.3 g/cm$^3$. The density is calculated by dividing the amount of application of negative electrode active material layer 22 (mass per unit area) by the thickness of negative electrode active material layer 22.

(Average Tortuosity Ratio)

Negative electrode active material layer 22 of the present embodiment has an average tortuosity ratio of 1.5 to 2.5. When negative electrode active material layer 22 has an average tortuosity ratio of 1.5 to 2.5, the temporarily decreased output after high-rate charging/discharging tends to be suppressed. Negative electrode active material layer 22 preferably has an average tortuosity ratio of 1.5 to 2.0.

The average tortuosity ratio is calculated by the following formula (1):

$$R=B/A \tag{1}$$

In the formula (1), "R" represents the average tortuosity ratio. "B" represents the average tortuous route length. "A" represents the average thickness of negative electrode active material layer 22.

Each of the average tortuous route length and the average thickness of negative electrode active material layer 22 is measured in a cross section parallel to the thickness direction of negative electrode active material layer 22. When the planar shape of negative electrode active material layer 22 is in the form of a strip, negative electrode active material layer 22 is equally divided into five or more regions in the long side direction (y axis direction in FIG. 3) of negative electrode active material layer 22. A sample piece is taken from the vicinity of the center of each region. The sample piece is subjected to cross section processing. For example, CP (cross section polisher) processing or the like may be performed. Thus, five or more cross sectional samples are prepared. A SEM (scanning electron microscope) is used to observe each cross sectional sample. Thus, five or more cross sectional SEM images are prepared.

Figure 4:
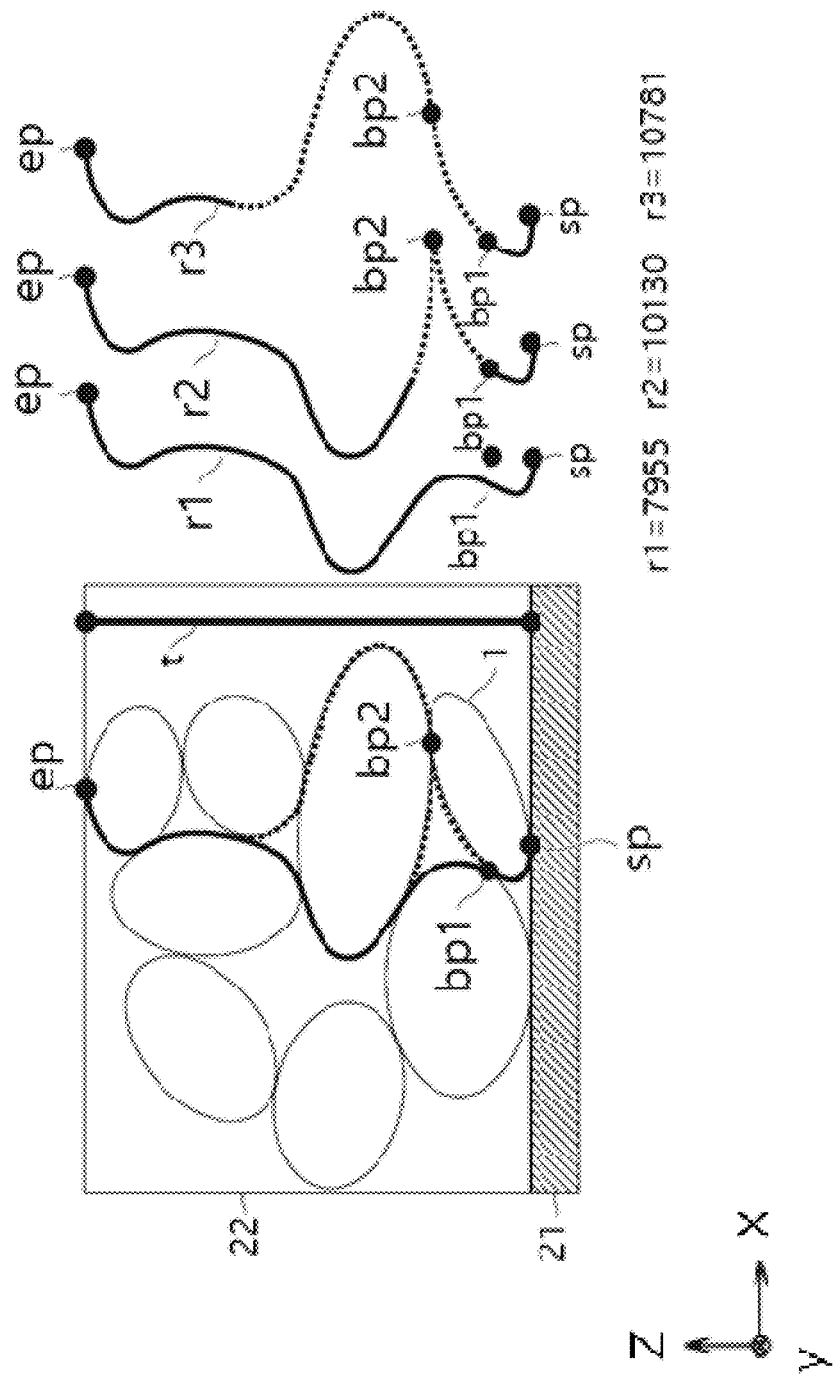
FIG. 4 is an explanatory diagram for a tortuous route length.

FIG. 4 is an explanatory diagram for the tortuous route length.

In each of the cross sectional SEM images, a contact point between a negative electrode active material particle 1 and negative electrode substrate 21 is freely extracted. The contact point is a starting point (sp). A route is drawn to extend from the starting point (sp) to the surface of negative electrode active material layer 22 along contour lines of the plurality of negative electrode active material particles 1. A point at which the route reaches the surface of negative electrode active material layer 22 is an end point (ep). When there is a branch point (bp1, bp2) on the route, the route is selected to have the shortest length. For example, in the example of FIG. 4, it is considered that there are a first branch point (bp1) and a second branch point (bp2) on the route from the start point (sp) to the end point (ep). Based on the first branch point (bp1) and the second branch point (bp2), a first route (r1), a second route (r2), and a third route (r3) are conceivable. The first route (r1) has a length of 7955 pixels in the cross sectional SEM image. The second route (r2) has a length of 10130 pixels in the cross sectional SEM image. The third route (r3) has a length of 10781 pixels in the cross sectional SEM image. Therefore, the first route (r1) is the shortest route. The first route (r1) is regarded as the tortuous route length for the starting point (sp). In one cross sectional SEM image, five or more tortuous route lengths are measured. That is, a total of 25 or more tortuous route lengths are measured. The arithmetic average of the 25 or more tortuous route lengths is regarded as the average tortuous route length.

Further, in each of the cross sectional SEM images, the shortest distance (t) between the surface of negative electrode substrate 21 and the surface of negative electrode active material layer 22 is measured. In one cross sectional SEM image, five or more shortest distances (t) are measured. That is, a total of 25 or more shortest distances (t) are measured. The arithmetic average of the 25 or more shortest distances (t) is regarded as the average thickness of negative electrode active material layer 22. Negative electrode active material layer 22 may have an average thickness of 10 µm to 200 µm, for example. Negative electrode active material layer 22 may have an average thickness of 10 µm to 100 µm, for example. Negative electrode active material layer 22 may have an average thickness of 20 µm to 50 µm, for example.

The average tortuosity ratio is calculated by dividing the average tortuous route length by the average thickness of negative electrode active material layer 22. The average tortuosity ratio is effective up to the first decimal place. The second and subsequent decimal places are rounded off.

Figure 5:
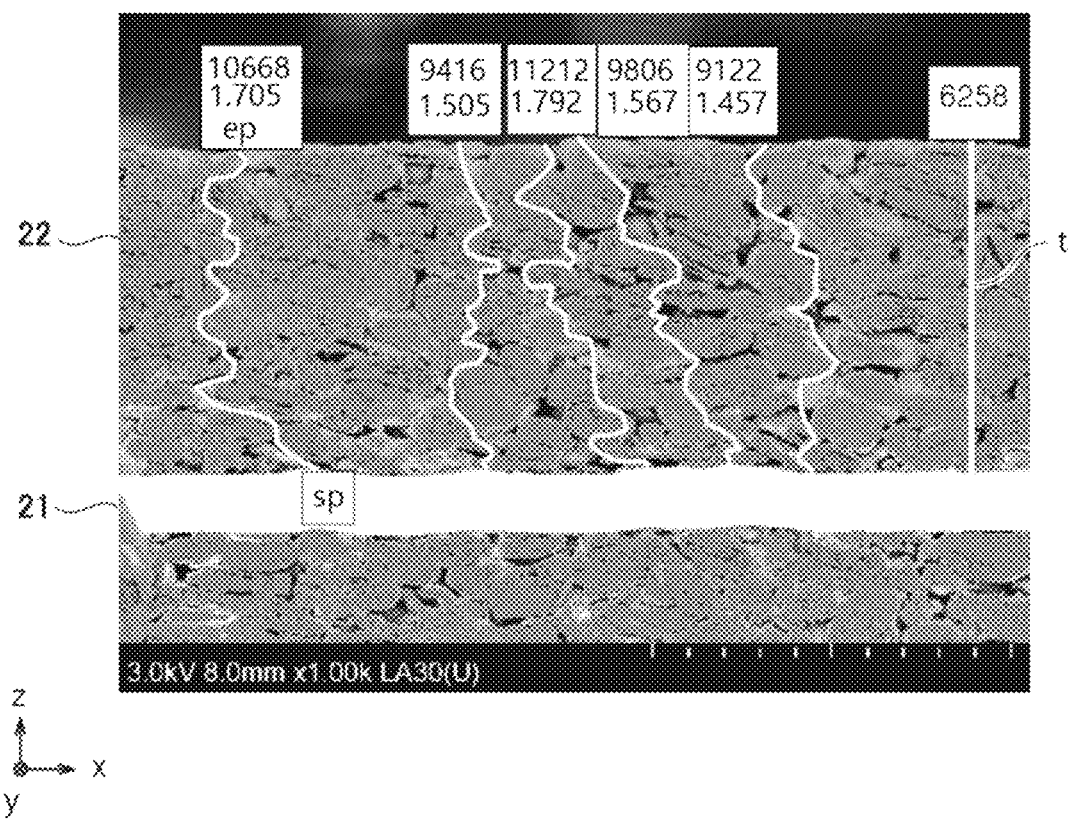
FIG. 5 shows a first measurement example of the tortuous route length.
Figure 6:
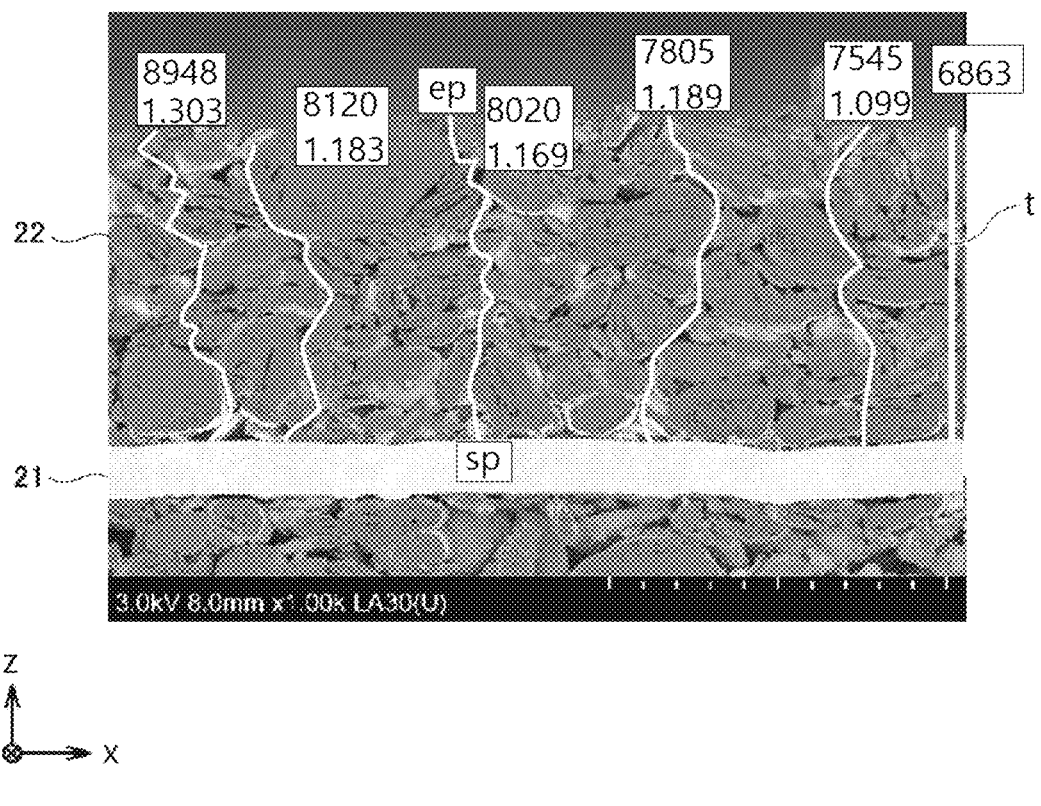
FIG. 6 shows a second measurement example of the tortuous route length.

FIG. 5 shows a first measurement example of the tortuous route length. FIG. 6 shows a second measurement example of the tortuous route length.

In FIGS. 5 and 6, a numerical value such as "10668" indicates the length of a route in the cross sectional SEM image. The routes of the pores in FIG. 5 (first measurement example) are more complicated than the routes of the pores in FIG. 6 (second measurement example). In FIG. 5 (first measurement example), the ratio of the tortuous route length to the shortest distance (t) is larger than that in FIG. 6 (second measurement example).

The average tortuosity ratio can be controlled by, for example, "(α) a slurry kneading time", "(β) the average aspect ratio of the negative electrode active material particles", "(γ) the ratio of the number of the large-aspect-ratio particles", or the like. For example, the average tortuosity ratio may be adjusted by any one of (α), (β) or (γ). For example, the average tortuosity ratio may be adjusted by a combination of (α) and (β) or the like. That is, the average tortuosity ratio may be adjusted by one or more selected from a group consisting of (α), (β) and (γ). It should be noted that the conditions (α), (β) and (γ) are merely exemplary, and the average tortuosity ratio may be adjusted by a condition other than these.

(α) Slurry Kneading Time

Negative electrode active material layer 22 may be formed by applying a negative electrode slurry, for example. The negative electrode slurry can be prepared, for example, by kneading the negative electrode active material particles, a binder, and a dispersion medium. For example, the average tortuosity ratio may be adjusted by the length of the kneading time. As the kneading time is longer, the average tortuosity ratio tends to be smaller. The kneading time may be, for example, 180 min to 300 min. It is also considered that the relation between the kneading time and the average tortuosity ratio may be changed due to influences of kneader, blade shape, shearing load, and the like.

(β) Average Aspect Ratio of Negative Electrode Active Material Particles

Figure 7:
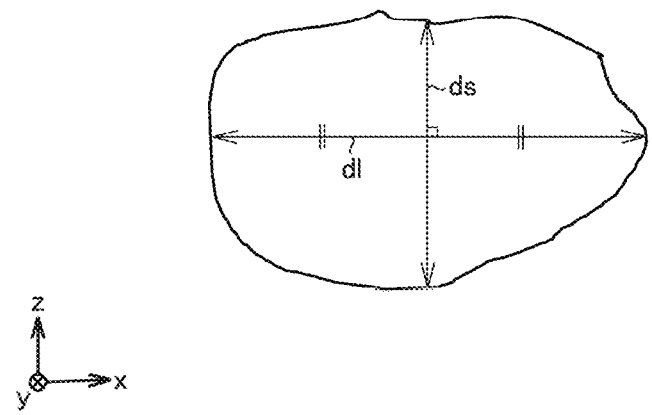
FIG. 7 is an explanatory diagram for an aspect ratio.

FIG. 7 is an explanatory diagram for the aspect ratio.

The aspect ratio of the negative electrode active material particles can be measured in each cross sectional SEM image used for the measurement of the tortuous route length. The aspect ratio represents a ratio of a major axis diameter (dl) to a minor axis diameter (ds). The major axis diameter (dl) in the present embodiment represents the maximum inner diameter of a particle in the cross section of the particle. The minor axis diameter (ds) represents an inner diameter that perpendicularly intersects the major axis diameter (dl) at the center of the major axis diameter (dl). In one cross sectional SEM image, aspect ratios of 20 or more negative electrode active material particles are measured. That is, aspect ratios of a total of 100 or more negative electrode active material particles are measured. The arithmetic average of the 100 or more aspect ratios is regarded as the average aspect ratio. The average aspect ratio is effective up to the first decimal place. The second and subsequent decimal places are rounded off.

For example, the average tortuosity ratio may be adjusted in accordance with the average aspect ratio. As the average aspect ratio is larger, the average tortuosity ratio tends to be larger. The average aspect ratio may be, for example, 2.5 to 4.0. The average aspect ratio is preferably 2.5 to 3.0.

(γ) Ratio of Number of Large-Aspect-Ratio Particles

Each of the large-aspect-ratio particles represents a negative electrode active material particle having an aspect ratio of more than or equal to 10. By measuring the aspect ratios of the total of the 100 or more negative electrode active material particles, the ratio (percentage) of the number of the large-aspect-ratio particles to the number of the measured particles is calculated. The ratio of the number of the large-aspect-ratio particles is effective only in the real number part. The decimal number part is rounded off.

For example, the average tortuosity ratio may be adjusted in accordance with the ratio of the number of the large-aspect-ratio particles. As the ratio of the number of the large-aspect-ratio particles is higher, the average tortuosity ratio tends to be larger. The ratio of the number of the large-aspect-ratio particles may be, for example, 5% to 22%. The ratio of the number of the large-aspect-ratio particles is preferably 5% to 13%. For example, the ratio of the number of the large-aspect-ratio particles may be adjusted by mixing a small amount of a group of particles each having a relatively large aspect ratio with a group of particles having a predetermined aspect ratio.

<<Positive Electrode Plate>>

Figure 8:
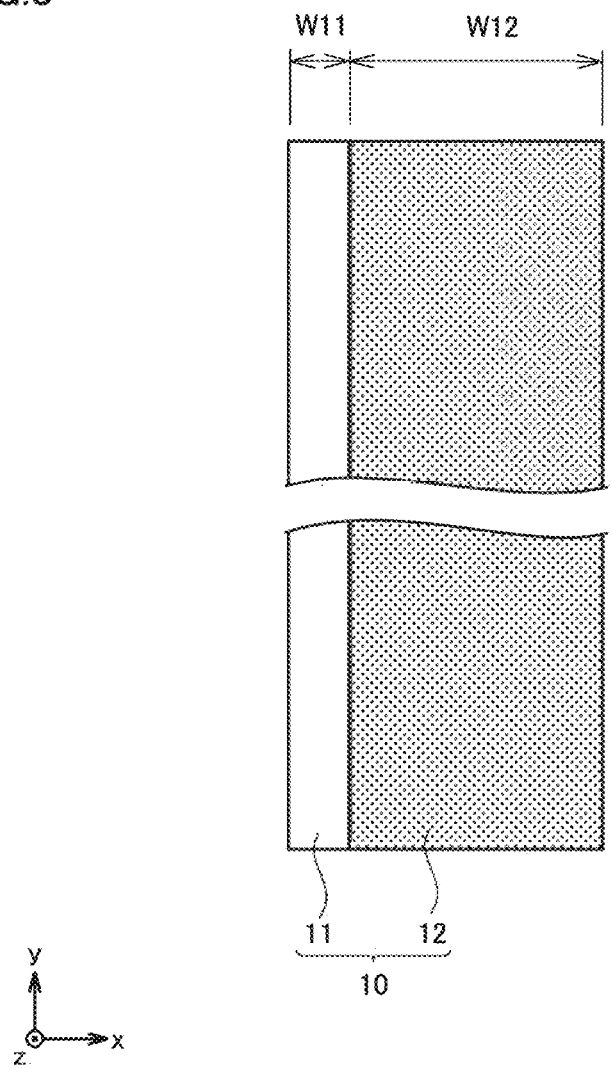
FIG. 8 is a schematic plan view showing an exemplary positive electrode plate in the present embodiment.

FIG. 8 is a schematic plan view showing an exemplary positive electrode plate in the present embodiment.

Positive electrode plate 10 is a sheet in the form of a strip. Positive electrode plate 10 includes a positive electrode substrate 11 and a positive electrode active material layer 12. Positive electrode substrate 11 may be, for example, an aluminum (Al) alloy foil or the like. Positive electrode active material layer 12 is disposed on a surface of positive electrode substrate 11. A portion of positive electrode substrate 11 is exposed from positive electrode active material layer 12. Hereinafter, the exposed portion of positive electrode substrate 11 is also referred to as "positive electrode substrate exposed portion". The positive electrode substrate exposed portion is disposed at one end portion in the short side direction (x axis direction in FIG. 8). The positive electrode substrate exposed portion extends in the long side direction (y axis direction in FIG. 8). The positive electrode substrate exposed portion can be used for connection between electrode assembly 50 and positive electrode terminal 91.

Positive electrode active material layer 12 includes a plurality of positive electrode active material particles. Each of the positive electrode active material particles can include any component. For example, the positive electrode active material particle may include at least one selected from a group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. Here, for example, a description such as "(NiCoMn)" in a composition formula such as "$Li(NiCoMn)O_2$" indicates that the total of the composition ratios in the parentheses is 1. Positive electrode active material layer 12 may further include, for example, a conductive material, a binder, and the like in addition to the positive electrode active material particles. The conductive material can include any component. The conductive material may include acetylene black or the like, for example. A blending amount of the conductive material may be, for example, 0.1 part by mass to 10 parts by mass with respect to 100 parts by mass of the positive electrode active material particles. The binder can include any component. For example, the binder can include polyvinylidene difluoride (PVDF) or the like. A blending amount of the binder may be, for example, 0.1 part by mass to 10 parts by mass with respect to 100 parts by mass of the positive electrode active material particles.

<<Separator>>

Electrode assembly 50 may include two separators 30, for example. Electrode assembly 50 may solely include one separator 30, for example. At least a portion of separator 30 is interposed between positive electrode plate 10 and negative electrode plate 20. Separator 30 separates positive electrode plate 10 and negative electrode plate 20 from each other. Separator 30 is a porous sheet in the form of a strip. Separator 30 may be composed of, for example, polyolefin. Separator 30 may be composed of, for example, polyethylene, polypropylene, or the like. For example, a ceramic particle layer or the like may be formed on a surface of separator 30.

<<Electrolyte Solution>>

Electrode assembly 50 is impregnated with at least part of the electrolyte solution. Electrode assembly 50 may be impregnated with a whole of the electrolyte solution. Electrode assembly 50 may be impregnated with part of the electrolyte solution. Part of the electrolyte solution may be stored outside electrode assembly 50. The electrolyte solution is a liquid electrolyte. The electrolyte solution includes a solvent and a supporting electrolyte. The solvent is aprotic. The solvent can include any component. For example, the solvent may include at least one selected from a group consisting of ethylene carbonate (EC), propylene carbonate (PC), ethyl methyl carbonate (EMC), dimethyl carbonate (DMC), and diethyl carbonate (DEC). The supporting electrolyte is dissolved in the solvent. The supporting electrolyte can include any component. For example, the supporting electrolyte may include at least one selected from a group consisting of $LiPF_6$, $LiBF_4$, and $LiN(FSO_2)_2$. For example, the electrolyte solution may further include an additive or the like in addition to the solvent and the supporting electrolyte. The additive may include vinylene carbonate (VC) or the like, for example.

EXAMPLES

The following describes an example of the present disclosure (hereinafter, also referred to as "the present example"). However, the scope of claims is not limited by the description below.

<Manufacturing of Nonaqueous Electrolyte Secondary Battery>

Batteries according to No. 1 to No. 5 were manufactured in the following manner.

<<No. 1>>

1. Preparation of Positive Electrode Plate

The following materials were prepared.

Positive electrode active material particles: $Li(NiCoMn)O_2$ powder
Conductive material: AB
Binder: PVDF
Dispersion medium: N-methyl-2-pyrrolidone
Substrate: Al alloy foil The positive electrode active material particles, the conductive material, the binder, and the dispersion medium were mixed and further kneaded to prepare a positive electrode slurry. The positive electrode slurry was applied to a surface of a positive electrode substrate 11 and was dried, thereby forming a positive electrode active material layer 12. Thus, a raw positive electrode was formed. The raw positive electrode was compressed and was cut into a predetermined size, thereby preparing a positive electrode plate 10. Positive electrode plate 10 was a sheet in the form of a strip. Positive electrode plate 10 had the following dimensions.

Width of the positive electrode substrate exposed portion (W11, see FIG. 8): 15 mm
Width of positive electrode active material layer 12 (W12, see FIG. 8): 90 mm
Width of positive electrode plate 10 (W11+W12): 105 mm 2. Preparation of Negative Electrode Plate The following materials were prepared.

Negative electrode active material particles: natural graphite powder (D50 of 10 μm)
Binder: CMC, SBR
Dispersion medium: Water
Negative electrode substrate: Cu alloy foil The negative electrode active material particles, the binder, and the dispersion medium were mixed and further kneaded to prepare a negative electrode slurry. A blending ratio of the solid contents was as follows: "natural graphite/CMC/SBR=99/0.6/0.4 (mass ratio)". The mixture was kneaded by a kneader manufactured by Asada Iron Works. The rotation speed of the disperser was 3000 rpm. The kneading time was 240 min.

The negative electrode slurry was applied to a surface of a negative electrode substrate 21 and was dried, thereby forming a negative electrode active material layer 22. Thus, a raw negative electrode was formed. The raw negative electrode was compressed and was cut into a predetermined size, thereby preparing a negative electrode plate 20. Negative electrode plate 20 was a sheet in the form of a strip. Negative electrode plate 20 had the following dimensions.

Width of the negative electrode substrate exposed portion (W21, see FIG. 3): 12 mm
Width of negative electrode active material layer 22 (W22, see FIG. 3): 95 mm
Width of negative electrode plate 20 (W21+W22): 107 mm A sample piece was taken from negative electrode plate 20 by a hole punch. The planar shape of the sample piece was a circular shape (diameter of 35 mm). The mass of the sample piece was measured. By subtracting the mass of negative electrode substrate 21 from the mass of the sample piece, the amount of application was calculated. The amount of application represents the mass of negative electrode active material layer 22 per unit area. The thickness of the sample piece was measured by a micrometer (product name "DIGIMICRO") manufactured by Nikon. By subtracting the thickness of negative electrode substrate 21 from the thickness of the sample piece, the thickness of negative electrode active material layer 22 was calculated. The density of negative electrode active material layer 22 was calculated from the amount of application and the thickness. Negative electrode active material layer 22 had a density of 1.20 g/cm$^3$.

3. Formation of Electrode Assembly

As a separator 30, a porous sheet in the form of a strip was prepared. Separator 30 was composed of polyolefin. Separator 30 had a width dimension of 100 mm. Separator 30, negative electrode plate 30, separator 30 and positive electrode plate 10 were layered in this order, and were spirally wound to form a cylindrical electrode assembly 50. Electrode assembly 50 was shaped to have a flat shape. Electrode assembly 50 had the following dimensions and the like.

Width of electrode assembly 50: 117 mm
Thickness of electrode assembly 50: 10.6 mm
Height of electrode assembly 50: 56.5 mm
The number of layers: 44 layers The width of electrode assembly 50 represents a dimension in the x axis direction of FIG. 2. The thickness of electrode assembly 50 represents a dimension in they axis direction in FIG. 2. The height of electrode assembly 50 represents a dimension in the z axis direction in FIG. 2. The number of layers represents the number of times of positive electrode plate 10 being intersected with a straight line drawn from the surface of electrode assembly 50 to the center of electrode assembly 50 in the thickness direction of electrode assembly 50 (y axis direction in FIG. 2).

4. Preparation of Electrolyte Solution

An electrolyte solution having the following composition was prepared.

Solvent: EC/EMC/DEC=3/3/4 (volume ratio)
Supporting electrolyte: LiPF$_6$ (concentration of 1 mol/L)
Additive: VC (concentration of 0.3 mass %)

The viscosity of the electrolyte solution was measured by a cone/plate viscometer manufactured by Anton Paar. The viscosity of the electrolyte solution at 25° C. was 4.1 Pa·s.

5. Storage

A battery case 90 was prepared. Battery case 90 had a prismatic shape. Battery case 90 had the following dimensions.

Width of battery case 90: 120 mm
Thickness of battery case 90: 12.5 mm
Height of battery case 90: 60 mm The width of battery case 90 represents a dimension in the x axis direction in FIG. 1. The thickness of battery case 90 represents a dimension in the y axis direction in FIG. 1. The height of battery case 90 represents a dimension in the z axis direction in FIG. 1.

Battery case 90 consisted of a container and a cover. The cover was provided with a positive electrode terminal 91 and a negative electrode terminal 92. Positive electrode terminal 91 and electrode assembly 50 were electrically connected to each other by a positive electrode current collecting member 81. Negative electrode terminal 92 and electrode assembly 50 were electrically connected to each other by a negative electrode current collecting member 82. Electrode assembly 50 was inserted into a pouch. The pouch was composed of a resin film (thickness of 0.15 mm). Electrode assembly 50 was stored in the container together with the pouch. The cover and the container were joined to each other by laser welding. The electrolyte solution was injected into battery case 90 from a liquid injection hole provided in the cover. Electrode assembly 50 was impregnated with the electrolyte solution. In this way, battery 100 was manufactured. Battery 100 was charged by a predetermined amount with the liquid injection hole being opened. During the charging, gas generated from electrode assembly 50 was ejected from the liquid injection hole. After the charging, the liquid injection hole was closed by a sealing plug. That is, battery case 90 was sealed. In this way, battery 100 according to No. 1 was manufactured. The rated capacity of battery 100 in the present example was 5 Ah.

<<No. 2>>

A battery 100 was manufactured in the same manner as in No. 1 except that the kneading time of the negative electrode slurry was changed to 300 min in the above-described section "2. Preparation of Negative Electrode Plate". The slurry kneading time in No. 2 is 1.25 times as long as the slurry kneading time in No. 1.

<<No. 3>>

A battery 100 was manufactured in the same manner as in No. 1 except that the kneading time of the negative electrode slurry was changed to 180 min in the above-described section "2. Preparation of Negative Electrode Plate". The slurry kneading time in No. 3 is 0.75 time as long as the slurry kneading time in No. 1.

<<No. 4>>

A battery 100 was manufactured in the same manner as in No. 1 except that the kneading time of the negative electrode slurry was changed to 360 min in the above-described section "2. Preparation of Negative Electrode Plate". The slurry kneading time in No. 4 is 1.5 times as long as the slurry kneading time in No. 1.

<<No. 5>>

A battery 100 was manufactured in the same manner as in No. 1 except that the kneading time of the negative electrode slurry was changed to 120 min in the above-described section "2. Preparation of Negative Electrode Plate". The slurry kneading time in No. 5 is 0.5 time as long as the slurry kneading time in No. 1.

<Evaluations>

Hereinafter, "CC-CV" in the present example represents a constant current-constant voltage mode. "CC" represents a constant current mode. "CV" represents a constant voltage mode. Further, "It" in "1 It" or the like is a symbol representing a rate of the current (hour rate), for example. With a current of 1 It, the rated capacity of the battery is discharged in one hour. For example, when the rated capacity of the battery is 5 Ah, 1 It corresponds to a current of 5 A.

(High-Rate Output Retention Ratio)

The state of charge (SOC) of the battery was adjusted to 50% by CC-CV charging. The current during the CC charging was 1 It. The total charging time of the CC-CV charging was 90 min. The voltage of the battery at an SOC of 50% was 3.69 V. After a rest of 30 min after the charging, the battery was discharged for 10 seconds with a current of 36 It. The discharging output on this occasion is an "initial output".

After measuring the initial output, the SOC of the battery was adjusted to 80% by the CC-CV charging. The current during the CC charging was 1 It. The total charging time in the CC-CV charging was 90 min. After adjusting the SOC, a high-rate cycle test was performed. That is, high-rate discharging and high-rate charging were performed alternately under the following conditions.

Discharging: discharging current=10 It; discharging capacity=capacity corresponding to the SOC of 20%
Charging: charging current=10 It; charging capacity=capacity corresponding to the SOC of 20%
Total charging/discharging time: 120 h After the high-rate cycle test, the discharging output was measured in the same manner as the initial output. The discharging output on this occasion is a "post-test output". The percentage of a value obtained by dividing the post-test output by the initial output is a "high-rate output retention ratio". The high-rate output retention ratio is shown in Table 1 below. As the high-rate output retention ratio is higher, the decreased output after high-rate charging/discharging is evaluated to be more suppressed.

(Low-Rate Output Retention Ratio)

The SOC of the battery was adjusted to 50% by CC-CV charging. The current during the CC charging was 1 It. The total charging time of the CC-CV charging was 90 min. The voltage of the battery at an SOC of 50% was 3.69 V. After a rest of 30 min after the charging, the battery was discharged for 10 seconds with a current of 36 It. The discharging output on this occasion is an "initial output".

After measuring the initial output, the SOC of the battery was adjusted to 80% by the CC-CV charging. The current during the CC charging was 1 It. The total charging time in the CC-CV charging was 90 min. After adjusting the SOC, a low-rate cycle test was performed. That is, low-rate discharging and low-rate charging were performed alternately under the following conditions.

Discharging: discharging current=1 It; discharging capacity=capacity corresponding to the SOC of 20%
Charging: charging current=1 It; charging capacity=capacity corresponding to the SOC of 20%
Total charging/discharging time: 1200 h After the low-rate cycle test, the discharging output was measured in the same manner as the initial output. The discharging output on this occasion is a "post-test output". The percentage of a value obtained by dividing the post-test output by the initial output is a "low-rate output retention ratio". The low-rate output retention ratio is shown in Table 1 below.

(Average Tortuosity Ratio)

After measuring the high-rate output retention ratio and the low-rate output retention ratio, the battery was discharged. After the discharging, the battery case was opened to collect the electrode assembly. The negative electrode plate was collected from the electrode assembly. In the electrode assembly, sample pieces of the negative electrode plate were taken from respective positions corresponding to the 4th layer, the 13th layer, the 22nd layer, the 31st layer, and the 40th layer. The planar size of each of the sample pieces was 20 mm×20 mm. In each sample piece, a cross section parallel to the thickness direction was observed by a SEM. As a result, five cross sectional SEM images were obtained. In each of the cross sectional SEM images, the thickness of the negative electrode active material layer was measured at five or more positions. The average thickness of the negative electrode active material layer was calculated through the arithmetic average of the thicknesses at the total of 25 or more positions. In each cross sectional SEM image, the tortuous route length was measured at five or more positions. The average tortuous route length was calculated through the arithmetic average of tortuous route lengths at the total of 25 or more positions. The average tortuosity ratio was calculated by the above formula (1). The average tortuosity ratio is shown in Table 1 below.

(Average Aspect Ratio)

From the five cross sectional SEM images, 100 or more negative electrode active material particles were freely extracted. The aspect ratio of each of the negative electrode active material particles was measured. The average aspect ratio was calculated through the arithmetic average of the 100 or more aspect ratios. The average aspect ratio is shown in Table 1 below.

(Ratio of Number of Large-Aspect-Ratio Particles)

The ratio of the number of large-aspect-ratio particles to the total number of the negative electrode active material particles having the aspect ratios measured was calculated. The ratio of the number of the large-aspect-ratio particles is shown in Table 1 below.

TABLE 1

|  |  | No. 1 | No. 2 | No. 3 | No. 4 | No. 5 |
|---|---|---|---|---|---|---|
| Slurry Kneading Time 1 [1] |  | 1 | 1.25 | 0.75 | 1.5 | 0.5 |
| Average Aspect Ratio |  | 3.0 | 2.5 | 4.0 | 1.9 | 4.3 |
| Ratio of Number of Large-Aspect-Ratio Particles [2] | % | 13 | 5 | 22 | 2 | 31 |
| Average Tortuous Route Length (B) | μm | 90 | 69 | 112.5 | 55 | 135 |
| Average Thickness of Negative Electrode Active Material Layer (A) | μm | 45 | 46 | 45 | 46 | 45 |
| Average Tortuosity Ratio (R = B/A) |  | 2.0 | 1.5 | 2.5 | 1.2 | 3.0 |
| High-rate Output Retention Ratio | % | 90 | 86 | 84 | 64 | 60 |
| Low-Rate Output Retention Ratio | % | 92 | 90 | 88 | 91 | 90 |

[1] indicates a ratio with respect to the kneading time (240 min) for the negative electrode slurry in sample 1.
[2] indicates a fraction of the number of negative electrode active material particles each having an aspect ratio of more than or equal to 10.

<Results>

Figure 9:
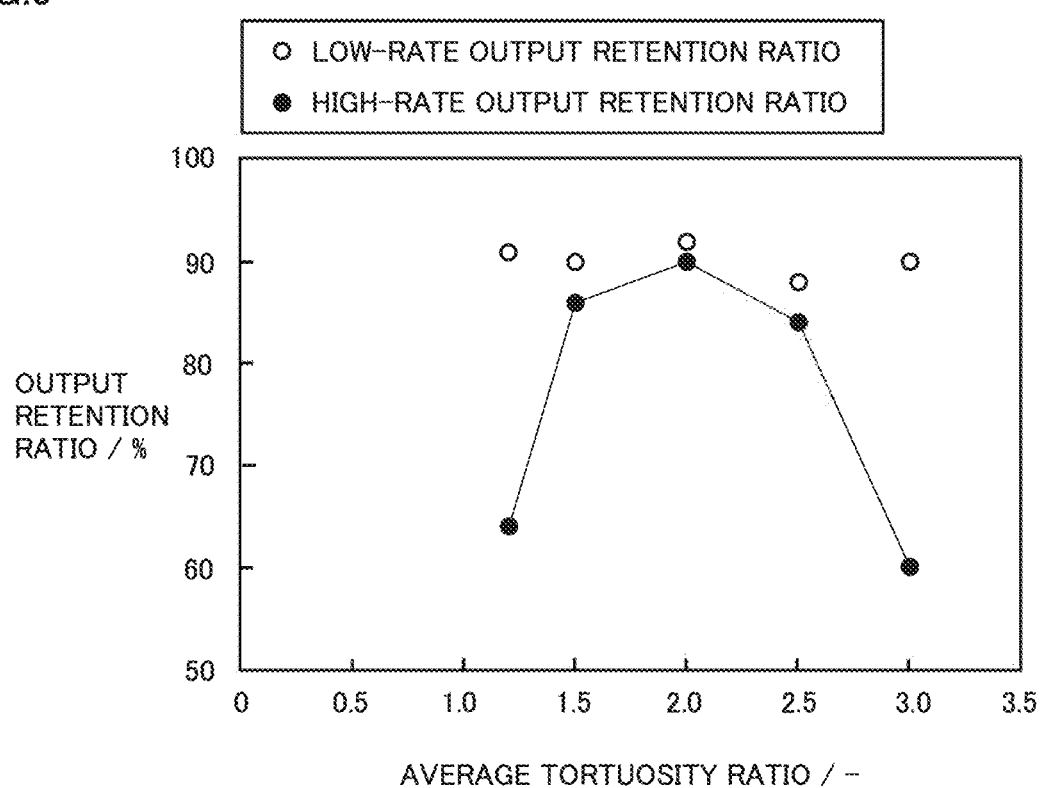
FIG. 9 is a graph showing a relation between an average tortuosity ratio and an output retention ratio.

FIG. 9 is a graph showing a relation between the average tortuosity ratio and the output retention ratio.

As shown in FIG. 9, the high-rate output retention ratio is significantly improved when the average tortuosity ratio falls within a range of 1.5 to 2.5. On the other hand, a correlation is unclear between the average tortuosity ratio and the low-rate output retention ratio. In the low-rate cycle test, it is considered that the output is unlikely to be decreased apparently.

The present embodiment and the present example are illustrative in any respects. The present embodiment and the present example are not restrictive. For example, it is initially expected to extract freely configurations from the present embodiment and the present example and combine them freely.

The technical scope defined by the terms of the claims encompasses any modification within the meaning equivalent to the terms of the claims. The technical scope defined by the terms of the claims also encompasses any modification within the scope equivalent to the terms of the claims.

What is claimed is:

1. A nonaqueous electrolyte secondary battery, comprising:
   an electrode assembly; and
   an electrolyte solution,
   wherein
   the electrode assembly is impregnated with at least part of the electrolyte solution, the electrode assembly includes a positive electrode plate, a negative electrode plate, and a separator, the separator separates the positive electrode plate and the negative electrode plate from each other, the negative electrode plate includes a negative electrode substrate and a negative electrode active material layer, the negative electrode active material layer is disposed on a surface of the negative electrode substrate, the negative electrode active material layer includes a plurality of negative electrode active material particles, in a cross section parallel to a thickness direction of the negative electrode active material layer, an average tortuosity ratio is 1.5 to 2.0, the average tortuosity ratio is calculated by the following formula (1):

$$R = B/A \quad (1)$$

where

R represents the average tortuosity ratio,

B represents an average value of lengths of shortest routes each extending from a contact point between the negative electrode substrate and a negative electrode active material particle to a surface of the negative electrode active material layer along contour lines of the plurality of negative electrode active material particles, and A represents an average value of a thickness of the negative electrode active material layer, in the cross section parallel to the thickness direction of the negative electrode active material layer, the plurality of negative electrode active material particles have an average aspect ratio of 2.5 to 4.0, the plurality of negative electrode active material particles consist essentially of natural graphite, and a density of the negative electrode active material layer is in a range of 1.1 g/cm$^3$ to 1.4 g/cm$^3$.

2. The nonaqueous electrolyte secondary battery according to claim 1, wherein the negative electrode active material layer further includes a binder, and at the surface of the negative electrode active material layer, a blending amount of the binder is 0.1 part by mass to 10 parts by mass with respect to 100 parts by mass of the negative electrode active material particles.

3. The nonaqueous electrolyte secondary battery according to claim 1, wherein in the cross section parallel to the thickness direction of the negative electrode active material layer, a ratio of the number of negative electrode active material particles each having an aspect ratio of more than or equal to 10 to the number of the plurality of negative electrode active material particles is 5% to 22%.

4. The nonaqueous electrolyte secondary battery according to claim 3, wherein the plurality of negative electrode active material particles have a D50 of 1 μm to 30 μm, and the D50 represents a particle size corresponding to a cumulative particle volume of 50% from a smallest particle size with respect to a total particle volume in a volume-based particle size distribution.

5. The nonaqueous electrolyte secondary battery according to claim 1, wherein the density of the negative electrode active material layer is in a range of 1.2 g/cm$^3$ to 1.4 g/cm$^3$.

6. The nonaqueous electrolyte secondary battery according to claim 5, wherein in the cross section parallel to the thickness direction of the negative electrode active material layer, a ratio of the number of negative electrode active material particles each having an aspect ratio of more than or equal to 10 to the number of the plurality of negative electrode active material particles is 5% to 22%.

7. The nonaqueous electrolyte secondary battery according to claim 6, wherein the plurality of negative electrode active material particles have a D50 of 1 μm to 30 μm, and the D50 represents a particle size corresponding to a cumulative particle volume of 50% from a smallest particle size with respect to a total particle volume in a volume-based particle size distribution.

* * * * *